United States Patent
Hettinger et al.

(10) Patent No.: US 10,814,765 B2
(45) Date of Patent: Oct. 27, 2020

(54) DUMPER BODY THAT INCLUDES STRUCTURAL TRANSITIONING

(71) Applicant: Caterpillar Inc., Deerfield, IL (US)

(72) Inventors: Daniel R. Hettinger, Monticello, IL (US); Varun Sampath Kumar, Chennai (IN)

(73) Assignee: Caterpillar Inc., Peoria, IL (US)

( * ) Notice: Subject to any disclaimer, the term of this patent is extended or adjusted under 35 U.S.C. 154(b) by 144 days.

(21) Appl. No.: 16/010,553

(22) Filed: Jun. 18, 2018

(65) Prior Publication Data
US 2019/0381924 A1    Dec. 19, 2019

(51) Int. Cl.
*B60P 1/28*    (2006.01)
*F16C 11/04*    (2006.01)

(52) U.S. Cl.
CPC .............. *B60P 1/283* (2013.01); *F16C 11/04* (2013.01); *F16C 2326/01* (2013.01)

(58) Field of Classification Search
CPC .. B60P 1/28; B60P 1/283; B60P 1/286; B60P 1/16; B60P 1/04; B60P 1/26; B60P 3/423; B60P 1/02; B60P 1/045

USPC ................. 298/17 R, 22 R, 17.5, 2, 11, 17.8
See application file for complete search history.

(56) References Cited

U.S. PATENT DOCUMENTS

| | | | |
|---|---|---|---|
| 2,910,322 A * | 10/1959 | Magor ................. | B62D 33/023 296/183.1 |
| 3,897,772 A * | 8/1975 | Averbuch ............... | B28D 5/025 125/30.01 |
| 7,789,467 B2 | 9/2010 | Rogers et al. | |
| 2003/0178883 A1 | 9/2003 | Hinds et al. | |
| 2007/0069569 A1* | 3/2007 | D'Amico ................ | B60P 1/286 298/7 |

* cited by examiner

*Primary Examiner* — D Glenn Dayoan
*Assistant Examiner* — Sunsurraye Westbrook
(74) *Attorney, Agent, or Firm* — Harrity & Harrity LLP (57) ABSTRACT

A dumper body is disclosed. The dumper body may include a pivot assembly. The dumper body may include at least one of: a set of ribs, wherein the set of ribs is connected to the pivot assembly such that the set of ribs is comprised of multiple respective discontinuous structures, and a set of stringers, wherein the set of stringers includes a respective stringer cut-out around an outside surface of a bed plate of the dumper body at a point where a top plate of the dumper body connects to an inside surface of the bed plate.

20 Claims, 8 Drawing Sheets

DUMPER BODY THAT INCLUDES STRUCTURAL TRANSITIONING

TECHNICAL FIELD

The present disclosure relates generally to a dumper body and, more particularly, to a dumper body that includes structural transitioning.

BACKGROUND

A machine, such as a large off-highway truck used in the mining and/or heavy construction industries, may include a dumper body that is used to move material (e.g., rocks, dirt, construction components, and/or the like) from one point to another. Due to the size, use, and/or cost of these types of machines, durability of the machine, and of the dumper body in particular, may be a consideration during design of the machine. In addition, overall manufacturing time and overall weight of the resulting machine may be considerations as well. For example, overall manufacturing time of the machine may impact a producer's capability to meet production deadlines for customers (e.g., a longer production time may negatively impact a producer's capability to meet a production deadline). Additionally, or alternatively, an increased overall weight of the resulting machine may be a result of attempting to increase a durability of the machine (e.g., via use of thick metal plates for components of the machine, via use of additional material for structural support of the machine, and/or the like) but may negatively impact a maximum payload weight that the machine can receive (e.g., the more the machine weighs, the less payload the machine may be capable of receiving due to total weight limitations of tires, brakes, and/or the like of the machine). As such, various components, such as a dumper body, may be adapted based on these considerations and/or for one or more uses and/or functions by varying the design of the components.

One attempt to adapt a dumper body is disclosed in U.S. Patent Application Publication No. 2003/0178883 published on Sep. 25, 2003 ("the '883 publication"). In particular, the '883 publication discloses a body support assembly for an off-highway truck. In particular, the '883 publication discloses a body support assembly for pivotally attaching the dumper body to the frame of the truck. The body support assembly includes a base member and a first and second body support member attached to the base member. The first and second body support members each include a bore adapted to receive a steel pin. The '883 publication provides a dumper body that can be manufactured without the need to line bore the pin bores after welding of the dumper body has been completed.

While the '883 publication may provide a dumper body that can be manufactured without the need to line bore the pin bores after welding of the dumper body has been completed, other designs of a dumper body may facilitate other functions and/or uses.

The dumper body of the present disclosure provides one or more other functions and/or uses that are different than what is set forth above in the art.

SUMMARY

According to some aspects, the present disclosure is related to a dumper body, comprising: a pivot assembly; and at least one of: a set of ribs, wherein the set of ribs is connected to the pivot assembly such that the set of ribs is comprised of multiple respective discontinuous structures; and a set of stringers, wherein the set of stringers includes a respective stringer cut-out around an outside surface of a bed plate of the dumper body at a point where a top plate of the dumper body connects to an inside surface of the bed plate.

According to some aspects, the present disclosure is related to a machine, comprising: a dumper body, wherein the dumper body comprises: multiple pivot assemblies; multiple ribs, wherein the multiple ribs are connected to the multiple pivot assemblies such that the multiple ribs are comprised of multiple respective discontinuous structures; and multiple stringers, wherein the multiple stringers include a respective stringer cut-out around an outside surface of a bed plate of the dumper body at a point where a top plate of the dumper body connects to an inside surface of the bed plate.

According to some aspects, the present disclosure is related to a pivot assembly, comprising: multiple plates, wherein the multiple plates comprise: a respective pivot bore and a respective doubler, wherein a first respective portion of a set of ribs of a dumper body is connected to a first plate, of the multiple plates, and a second respective portion of the set of ribs is connected to a second plate of the multiple plates, wherein the first respective portion and the second respective portion are discontinuous from each other; and multiple sets of gussets, wherein a first set of gussets, of the multiple sets of gussets, is connected to the first plate and the first respective portion, and a second set of gussets, of the multiple sets of gussets, is connected to the second plate and the second respective portion.

DETAILED DESCRIPTION

Figure 1:
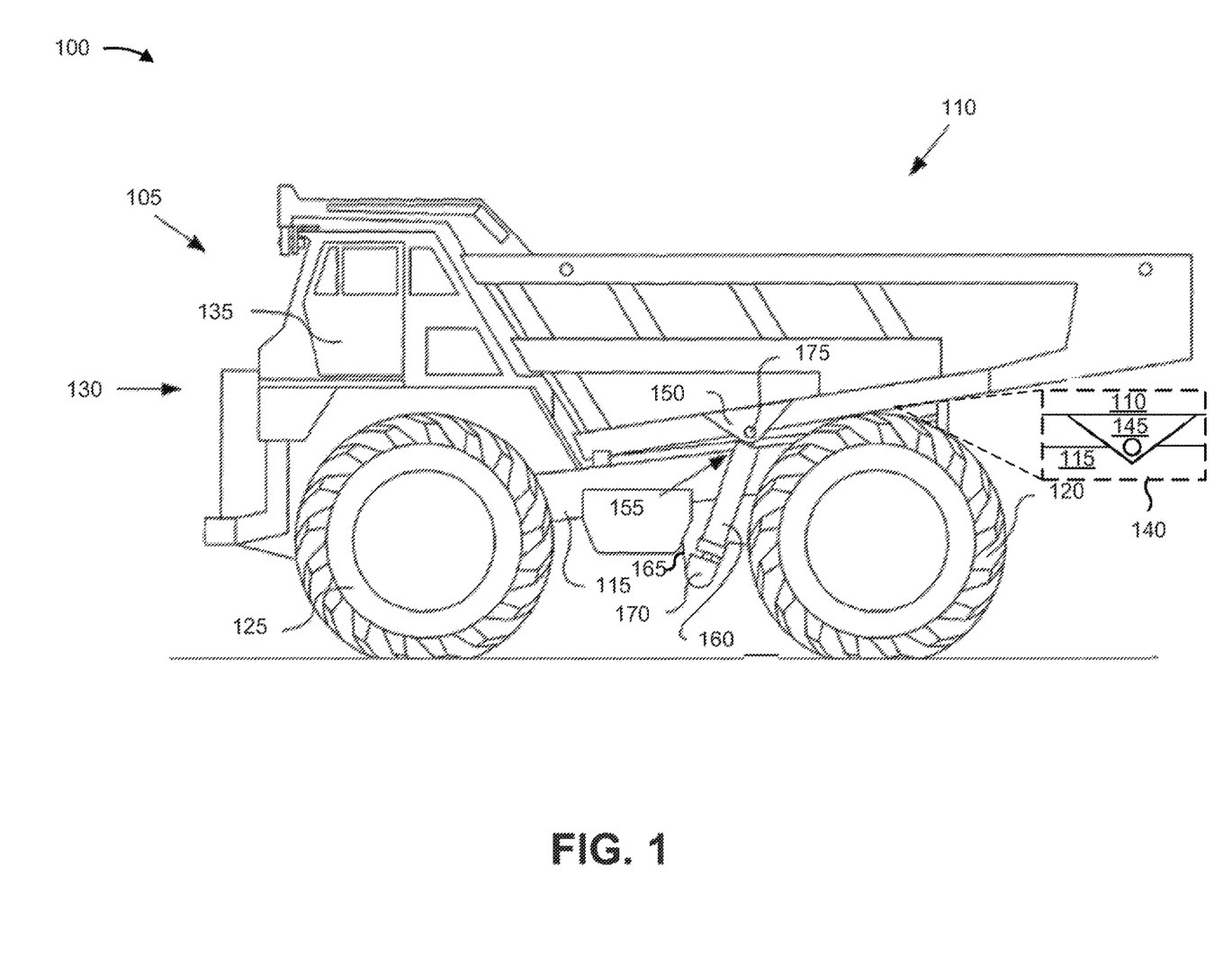
FIG. 1 is a diagram of a side view of an example machine that includes a dumper body that includes structural transitioning.

FIG. 1 is a diagram 100 of a side view of an example machine that includes a dumper body that includes structural transitioning. FIG. 1 shows an off-highway truck 105 having a dumper body 110. The off-highway truck 105 may include a frame 115 having a plurality of rear wheels 120 and a pair of front wheels 125. An engine compartment 130 and an operator's cab 135 may be mounted at one end of the frame 115. An engine (not shown in FIG. 1) and a transmission (not shown in FIG. 1) may be mounted within the engine compartment 130.

The dumper body 110 may include a box portion and a skeletal structure. The dumper body 110 may comprise steel, aluminum, and/or the like. The box portion may define an inside surface and an outside surface (e.g., of a bed plate, or multiple bed plates, that form a base or a floor of the box portion). The box portion may include two side walls (e.g., a first side wall and a second side wall), and a front wall positioned between the first side wall and the second side wall toward the end of the machine that includes the engine compartment 130 and/or the operator's cab 135. The dumper body 110 may, in some implementations, include a tailgate to prevent payload from spilling from dumper body 110 during transport. The tailgate may be configured to move between an open position and a closed position. The tailgate, if the dumper body 110 is so equipped, may be positioned in the box portion toward another end of the off-highway truck 105 away from the end that includes the engine compartment 130 and/or the operator's cab 135 (e.g., that is the dumping end of a rear dump dumper body 110).

The skeletal structure may include a pair of stringers that extend along the outside surface of a bed plate of the dumper body 110 between a first end of the dumper body 110 that includes the front wall and a second end of the dumper body 110 that includes the tailgate (e.g., an end that is the dumping end of the dumper body 110), a plurality of ribs that extend along the outside surface of the bed plate of the dumper body 110 between a first side of the bed plate of the dumper body 110 that includes the first side wall and a second side of the bed plate of the dumper body 110 that includes the second side wall.

As shown by reference number 140, the dumper body 110 may be pivotally attached to frame 115 by a pivot assembly 145 (e.g., the same as or similar to a pivot assembly 208 described elsewhere herein). The pivot assembly 145 may be located on the outside surface of the dumper body 110 (e.g., on the outside surface of the bed plate of the dumper body 110), toward the middle or rear of the dumper body 110. The dumper body 110 may further include a pair of cylinder brackets 150. The pair of cylinder brackets 150 may be connected to the outside surface of the bed plate of the dumper body 110. The pair of cylinder brackets 150 may be positioned toward the front of the dumper body 110. A cylinder bracket 150 may be configured to receive a first end 155 of a hydraulic cylinder 160.

As further shown in FIG. 1, a second pair of cylinder brackets 165 may be connected to a second end 170 of the hydraulic cylinder 160. The first end 155 and the second end 170 may be connected to pivot bores of respective cylinder brackets (e.g., cylinder bracket 150 may be connected to the first end 155 via a pivot bore 175). The hydraulic cylinders 160 may be moveable between a retracted position (shown) and an extended position (not shown). In the extended position, front end of dumper body 110 may be raised for ejecting payload from the box portion of dumper body 110. The retracted position may be utilized for loading payload into the box portion of dumper body 110.

As indicated above, FIG. 1 is provided as an example. Other examples are possible and may differ from what was described in connection with FIG. 1. In some implementations, off-highway truck 105 may include additional components, fewer components, different components, or differently arranged components than those shown in FIG. 1.

Figure 2:
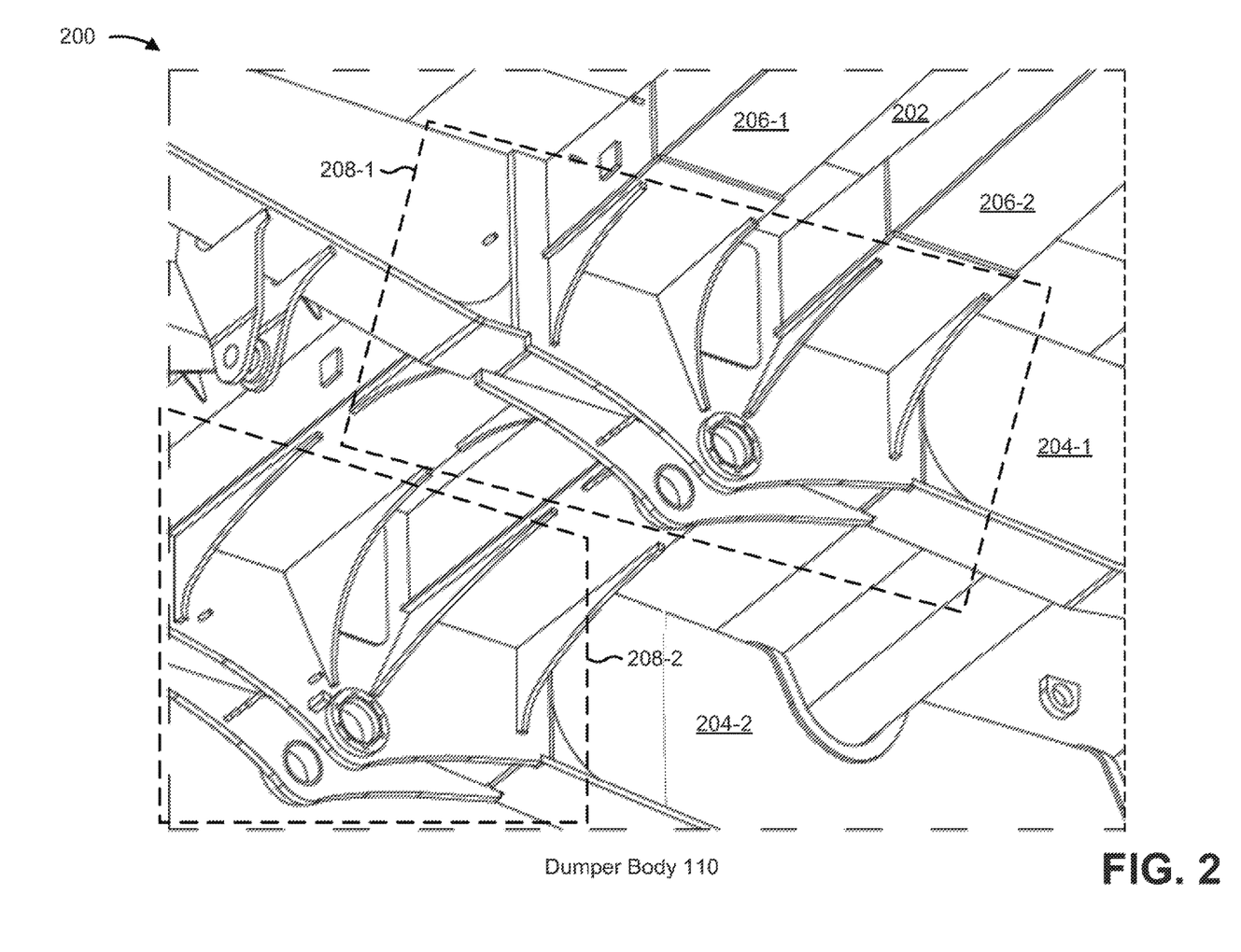
FIG. 2 is a diagram of a perspective view of an example outside surface of a bed plate of a dumper body of the example machine of FIG. 1.

FIG. 2 is a diagram 200 of a perspective view of an example outside surface of a bed plate of a dumper body of the example machine of FIG. 1. For example, FIG. 2 shows a bottom of a box portion of the dumper body 110 (e.g., an outside surface of a bed plate of the dumper body 110). As shown in FIG. 2, the dumper body 110 may include a bed plate 202. The bed plate 202 may form an outside surface of the dumper body 110 (e.g., an outside surface of a box portion of the dumper body 110). In some implementations, the bed plate 202 may form an inside surface, or a floor, of the dumper body 110 (e.g., of a box portion of the dumper body 110). In some implementations, one or more other plates, similar to bed plate 202, may be connected to bed plate 202 to form the inside surface of the dumper body 110.

As further shown in FIG. 2, dumper body 110 may include a set of stringers 204 (e.g., stringers 204-1 and 204-2). In some implementations, the set of stringers 204 may be connected to the bed plate 202. For example, the set of stringers 204 may be connected to the bed plate 202 via welding, via use of a fastener (e.g., a bolt, a rivet, a screw, and/or the like), and/or the like. In some implementations, the set of stringers 204 may be fabricated from metal, such as steel, aluminum, and/or the like. In some implementations, the set of stringers 204 may extend from a first end of the dumper body 110 that includes a front wall to a second end of the dumper body 110 that includes a tailgate (e.g., which is the dumping end of the dumper body 110). For example, the set of stringers 204 may extend in a direction parallel to a general direction of travel of the off-highway truck 105. The set of stringers 204 may include various components, as described elsewhere herein.

As further shown in FIG. 2, the dumper body 110 may include a set of ribs 206 (e.g., ribs 206-1 and 206-2). In some implementations, the set of ribs 206 may be connected to bed plate 202. For example, the set of ribs 206 may be connected to bed plate 202 via welding, via use of a fastener, and/or the like. In some implementations, the set of ribs 206 may be fabricated from metal, such as steel, aluminum, and/or the like. In some implementations, the set of ribs 206 may extend between sides of bed plate 202. For example, the set of ribs 206 may extend perpendicular to a general direction of travel of off-highway truck 105. The set of ribs 206 may include various components, as described elsewhere herein.

In some implementations, the dumper body 110 may include stringers 204 along a width of the bed plate 202 (e.g., equally or unequally spaced along the width of the bed plate 202). Additionally, or alternatively, dumper body 110 may include ribs 206 along a length of bed plate 202 (e.g., equally or unequally spaced along the length of bed plate 202). In some implementations, stringers 204 and ribs 206 may intersect each other (e.g., in a generally perpendicular manner). For example, and as shown in FIG. 2, the set of stringers 204 and the set of ribs 206 may intersect each other in a perpendicular manner.

As further shown in FIG. 2, the dumper body 110 may include a set of pivot assemblies 208 (e.g., pivot assemblies 208-1 and 208-2). The set of pivot assemblies 208 may facilitate rotation of the dumper body 110 into various positions by movement of a set of hydraulic cylinders 160 associated with the off-highway truck 105, such as for hauling or unloading of payload. As further shown in FIG. 2, stringers 204-1 and 204-2 may include a respective pivot assembly 208 (e.g., stringer 204-1 may include pivot assembly 208-1 and stringer 204-2 may include pivot assembly 208-2). For example, plates of pivot assemblies 208-1 and 208-2 (described elsewhere herein) may be parallel with stringers 204-1 and 204-2, respectively. In some implementations, and as shown in FIG. 2, the set of ribs 206 of the dumper body 110 may intersect the set of pivot assemblies 208 (e.g., may intersect the plates of the set of pivot assemblies 208). For example, the set of ribs 206 may intersect the plates of the set of pivot assemblies 208 in a perpendicular manner.

As indicated above, FIG. 2 is provided as an example. Other examples are possible and may differ from what was described in connection with FIG. 2. In some implementations, dumper body 110 may include additional components, fewer components, different components, or differently arranged components than those shown in FIG. 2.

Figure 3:
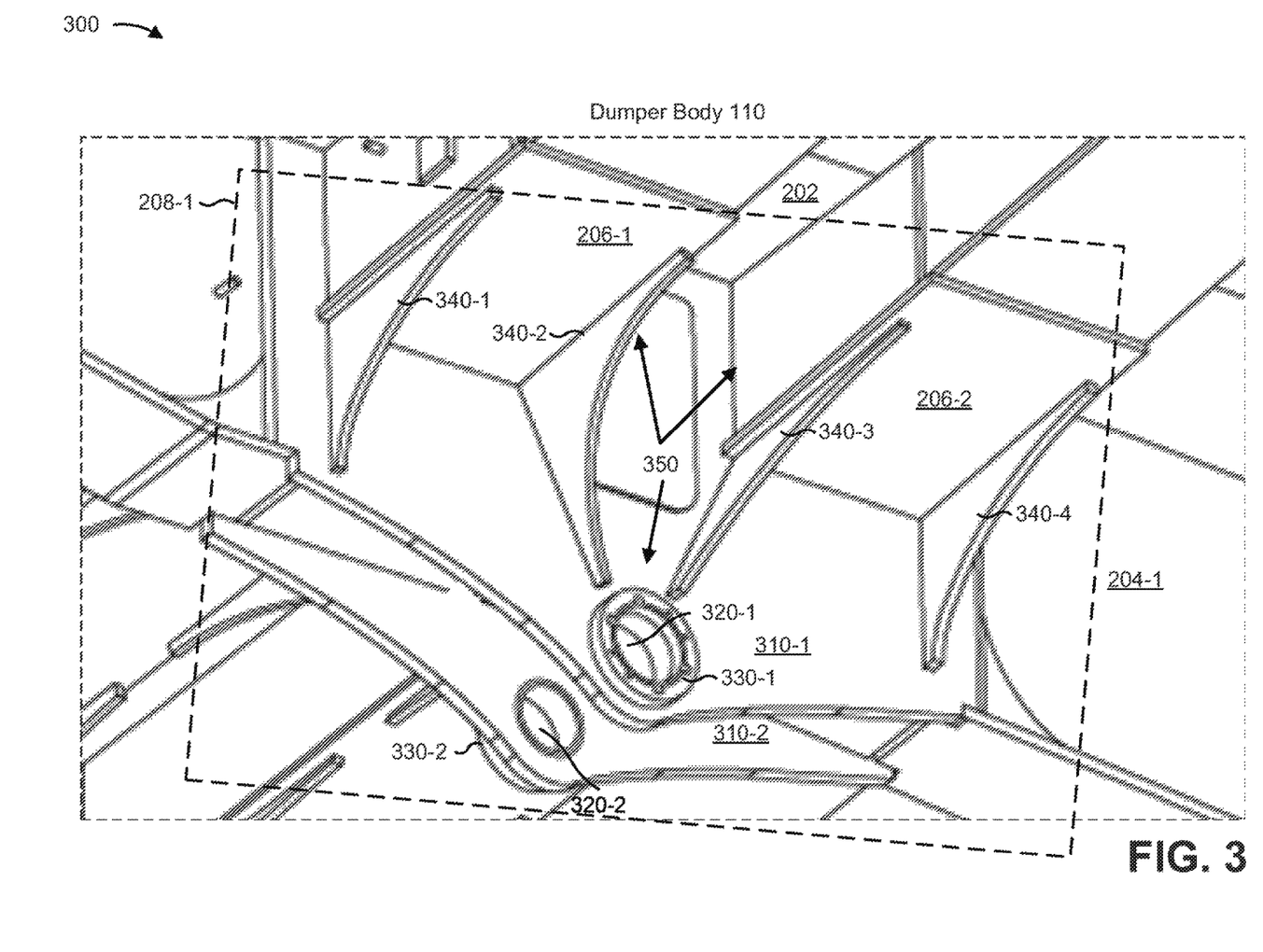
FIG. 3 is a diagram of a perspective view of an example pivot assembly installed on a dumper body of the example machine of FIG. 1.

FIG. 3 is a diagram 300 of a perspective view of an example pivot assembly installed on a dumper body of the example machine of FIG. 1. For example, FIG. 3 shows a perspective view of various components of the pivot assembly 208-1 installed on the dumper body 110. Although shown in the context of pivot assembly 208-1, the implementations apply equally to the pivot assembly 208-2.

As shown in FIG. 3, pivot assembly 208-1 may include a set of plates 310 (e.g., plate 310-1 and plate 310-2). For example, pivot assembly 208-1 may include a set of metal plates as the plates 310-1 and 310-2. In some implementations, the set of plates 310 may be connected to portions of stringer 204-1 (e.g., welded to stringer 204-1). Additionally, or alternatively, the set of plates 310 may be connected to respective portions of the set of ribs 206 (e.g., welded to the ribs 206-1 and 206-2), as described elsewhere herein. Additionally, or alternatively, the set of plates 310 may generally form a body of the pivot assembly 208-1 to which other components of the pivot assembly 208-1 may be connected.

As further shown in FIG. 3, the pivot assembly 208-1 may include a set of pivot bores 320 (e.g., pivot bores 320-1 and 320-2). For example, the plate 310 may be formed such that the plate 310 defines a respective pivot bore 320 (e.g., the plate 310-1 may be formed such that the plate 310-1 defines the pivot bore 320-1). In some implementations, the pivot bore 320 may be configured to receive a pin and/or an associated bushing about which dumper body 110 may be rotated into various positions.

As further shown in FIG. 3, the pivot assembly 208 may include a set of doublers 330 (e.g., doublers 330-1 and 330-2). For example, the set of doublers 330 may be connected to the set of plates 310 around the set of pivot bores 320. In some implementations, a doubler 330 may be associated with a pivot bore 320 (e.g., a respective doubler 330 may be associated with the set of pivot bores 320). In some implementations, the set of doublers 330 may be produced from metal. In some implementations, the set of doublers 330 may provide reinforcement to the set of pivot bores 320, may include bearings to facilitate rotation of dumper body 110, may protect the set of pivot bores 320 from damage during use, and/or the like.

As further shown in FIG. 3, the dumper body 110 and/or the pivot assembly 208-1 may include a set of gussets 340 (e.g., shown as gussets 340-1 through 340-4). For example, the set of gussets 340 may be connected (e.g., welded, connected using a fastener, and/or the like) to a respective plate 310 of the pivot assembly 208-1. In some implementations, the set of gussets 340 may be connected to an outer surface of the plate 310. For example, the gussets 340-1 through 340-4 may be connected to an outer surface of the plate 310-1. A similar set of gussets 340 may be connected to an outer surface of the plate 310-2 in a similar manner. In some implementations, and as further shown in FIG. 3, subsets of the set of gussets 340 may be connected to respective ribs 206. For example, the gussets 340-1 and 340-2 may be connected to the rib 206-1 and the gussets 340-3 and 340-4 may be connected to the rib 206-2.

In some implementations, the set of gussets 340 may provide mechanical support for the pivot assembly 208-1 and/or the set of ribs 206, may transfer load stresses from the set of ribs 206 to pivot assembly 208-1, and/or the like. Additionally, or alternatively, the set of gussets 340 may provide needed flexibility to the dumper body 110 to absorb mechanical stress to prevent damage to the dumper body 110 during movement of payload (e.g., damage that could occur due to stresses experienced while traveling on bumpy or uneven roads, damage that could occur from shifting of payload and/or other stresses experienced during turning of the off-highway truck 105, and/or the like).

As further shown in FIG. 3, the set of pivot bores 320 may be positioned relative to the set of ribs 206 when installed on dumper body 110 such that the set of pivot bores 320 is not aligned with the set of ribs 206. For example, and as shown by reference number 350, the pivot bore 320-1 may be aligned within the plate 310-1 such that the pivot bore 320-1 is between the ribs 206-1 and 206-2 and is not in line with either the rib 206-1 or the rib 206-2.

In some implementations, and as further shown in FIG. 3, a configuration of some of the gussets 340 of the set of gussets 340 may be based on this configuration of the set of pivot bores 320. For example, and as shown in FIG. 3, the gussets 340-2 and 340-3 may be connected to the plate 310-1 in an angled manner toward the pivot bore 320-1. This may facilitate transfer of load stresses to the pivot bore 320-1 and/or a pin installed through the pivot bore 320-1. In some implementations, the gussets 340 connected to the plate 310-2 may be configured in a similar manner.

As indicated above, FIG. 3 is provided as an example. Other examples are possible and may differ from what was described in connection with FIG. 3. In some implementations, pivot assembly 208 may include additional components, fewer components, different components, or differently arranged components than those shown in FIG. 3.

Figure 4:
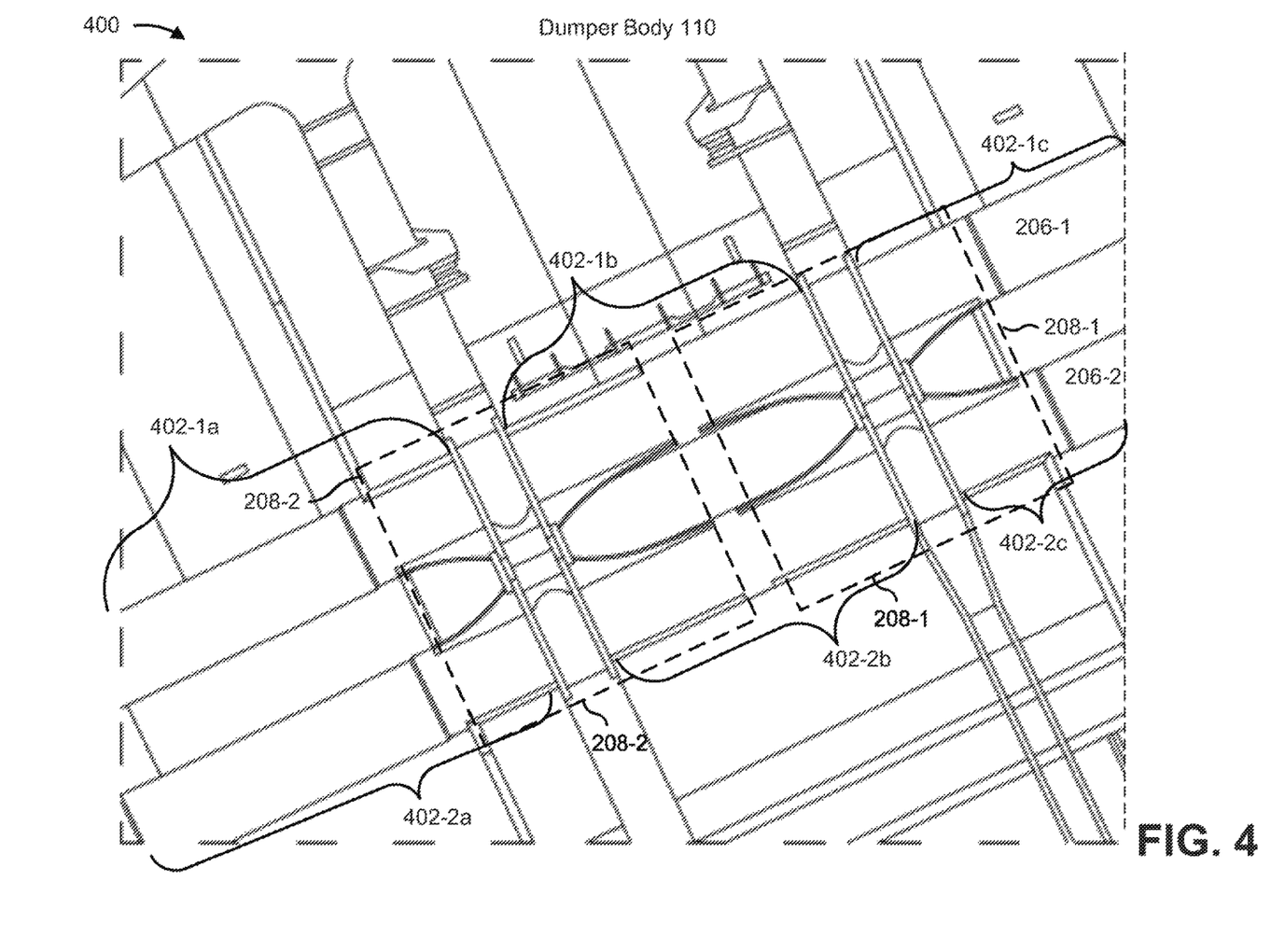
FIG. 4 is a diagram of a top view of multiple example pivot assemblies installed on a dumper body of the example machine of FIG. 1.

FIG. 4 is a diagram 400 of a top view of multiple example pivot assemblies installed on a dumper body of the example machine of FIG. 1. For example, FIG. 4 shows a top view of multiple pivot assemblies 208 installed on the dumper body 110 and various components of the set of ribs 206 relative to the multiple pivot assemblies 208.

In some implementations, and as shown in FIG. 4, a rib 206 may include multiple portions (e.g., multiple discontinuous structures). For example, the portions of the rib 206 may not be connected to each other, may be separate structures installed on the bed plate 202, and/or the like. As an example, with respect to the rib 206-1, the rib 206-1 may include a portion 402-1a, a portion 402-1b, and a portion 402-1c. Continuing with the previous example, the portion 402-1a may be connected to a first plate 310 of the pivot assembly 208-2 (e.g., an exterior plate 310 of the pivot assembly 208-2), the portion 402-1b may be connected to a second plate 310 of the pivot assembly 208-2 (e.g., an interior plate 310 of the pivot assembly 208-2) and a first plate 310 of the pivot assembly 208-1 (e.g., an interior plate 310 of the pivot assembly 208-1), and the portion 402-1c may be connected to a second plate of the pivot assembly 208-1 (e.g., an exterior plate 310 of the pivot assembly 208-1). In some implementations, the various portions of the rib 206-1 may be connected to outer surfaces of the plates 310 of the pivot assembly 208-1 and the pivot assembly 208-2. In some implementations, the rib 206-2 may include a similar configuration of portions of the rib 206-2.

As indicated above, FIG. 4 is provided as an example. Other examples are possible and may differ from what was described in connection with FIG. 4. In some implementations, the dumper body 110 may include additional components, fewer components, different components, or differently arranged components than those shown in FIG. 4.

Figure 5:
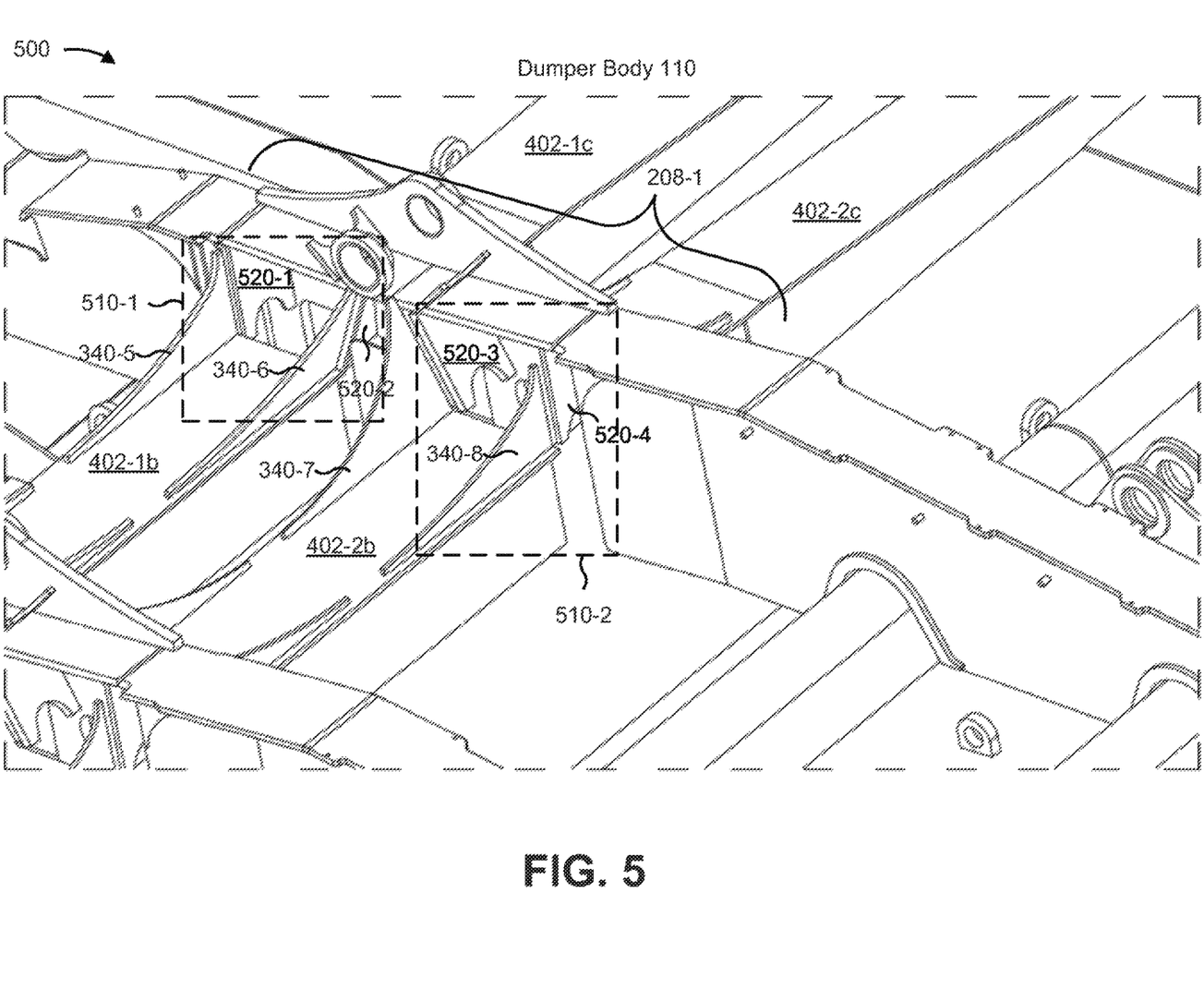
FIG. 5 is a diagram of an internal view of an example pivot assembly installed on a dumper body of the example machine of FIG. 1.

FIG. 5 is a diagram 500 of an internal view of an example pivot assembly installed on a dumper body of the example machine of FIG. 1. For example, FIG. 5 shows, for explanatory and/or illustrative purposes, the pivot assembly 208-1 with one of the plates 310 removed to show an internal configuration of the pivot assembly 208-1. FIG. 5 shows an example of multiple respective discontinuous structures of the ribs 206-1 and 206-2.

As shown by reference number 510-1, the portion 402-1b and the portion 402-1c are two separate structures and are not connected to each other. Rather, these portions of the rib 206-1 are connected to the pivot assembly 208-1 via the set of plates 310 associated with the pivot assembly 208-1 and the set of gussets 340 associated with the pivot assembly 208-1. In some implementations, the portions 402-1a and 402-1b may be connected to the pivot assembly 208-2 in a similar manner. In addition, the rib 206-2 may be configured with respect to the pivot assembly 208-2 in a manner similar to that described above with respect to the stringer 206-1. For example, reference number 510-2 shows a configuration that is the same as or similar to that described with regard to reference number 510-1.

As further shown in FIG. 5, the pivot assembly 208-1 may include a set of internal gussets 520 within a body of the pivot assembly 208-1 (e.g., internal gussets 520-1 through 520-4). In some implementations, the set of internal gussets 520 may provide mechanical support for other components of the pivot assembly 208-1, may provide rigidity to the pivot assembly 208-1, and/or the like. In some implementations, the set of internal gussets 520 may include a first subset of internal gussets 520 positioned on one side of the pivot bores 320 (reference number not shown in FIG. 5) and a second subset of internal gussets 520 on another side of the pivot bores 320.

As indicated above, FIG. 5 is provided as an example. Other examples are possible and may differ from what was described in connection with FIG. 5. In some implementations, the dumper body 110 may include additional components, fewer components, different components, or differently arranged components than those shown in FIG. 5.

Figure 6:
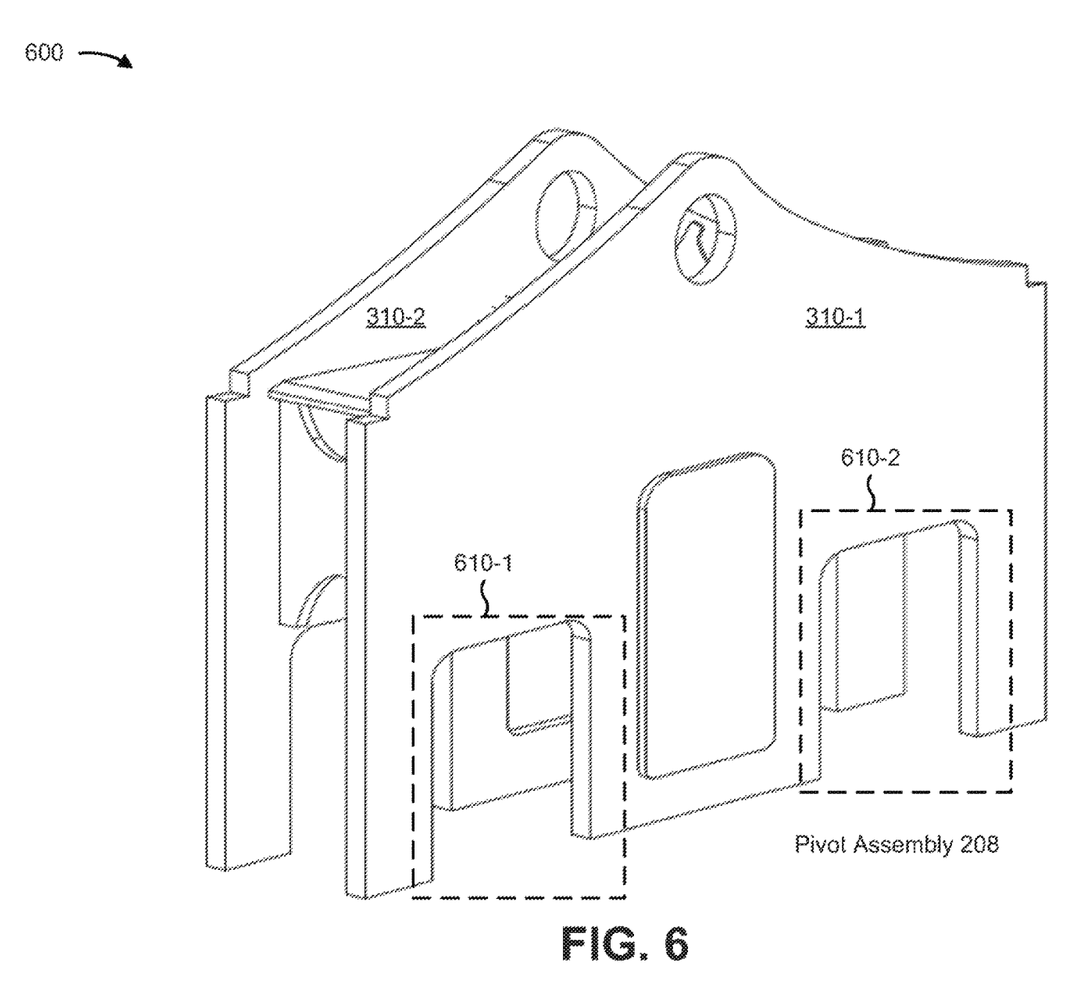
FIG. 6 is a diagram of a perspective view of an example pivot assembly of the example machine of FIG. 1.

FIG. 6 is a diagram 600 of a perspective view of an example pivot assembly of the example machine of FIG. 1. For example, FIG. 6 shows a perspective view of a configuration of a pivot assembly 208 (e.g., the pivot assembly 208-1 and/or the pivot assembly 208-2, described elsewhere herein).

As shown in FIG. 6, plate 310-1 of the pivot assembly 208 may include a set of cut-outs 610 (e.g., cut-outs 610-1 and 610-2). In some implementations, the set of cut-outs 610 may be associated with the set of ribs 206 (e.g., the pivot assembly 208 may include a set of respective cut-outs 610 for a set of ribs 206). For example, the plate 310-1 may include a respective cut-out 610 associated with the set of ribs 206 (e.g., the cut-out 610-1 may be associated with the rib 206-1 and the cut-out 610-2 may be associated with the rib 206-2). In some implementations, the set of cut-outs 610 may be formed in the plate 310 where a respective rib 206 is to be connected to the plate 310. In some implementations, dimensions of the cut-out 610-1 may be based on dimensions of the rib 206 associated with the cut-out 610. For example, dimensions of the cut-out 610 may be such that the cut-out 610 is within a structure of the rib 206. In some implementations, the plate 310-2 may include a set of cut-outs 610 that is the same as or similar to that described with regard to the plate 310-1.

As indicated above, FIG. 6 is provided as an example. Other examples are possible and may differ from what was described with regard to FIG. 6. In some implementations, the pivot assembly 208 may include additional components, fewer components, different components, or differently arranged components than those shown in FIG. 6.

Figure 7:
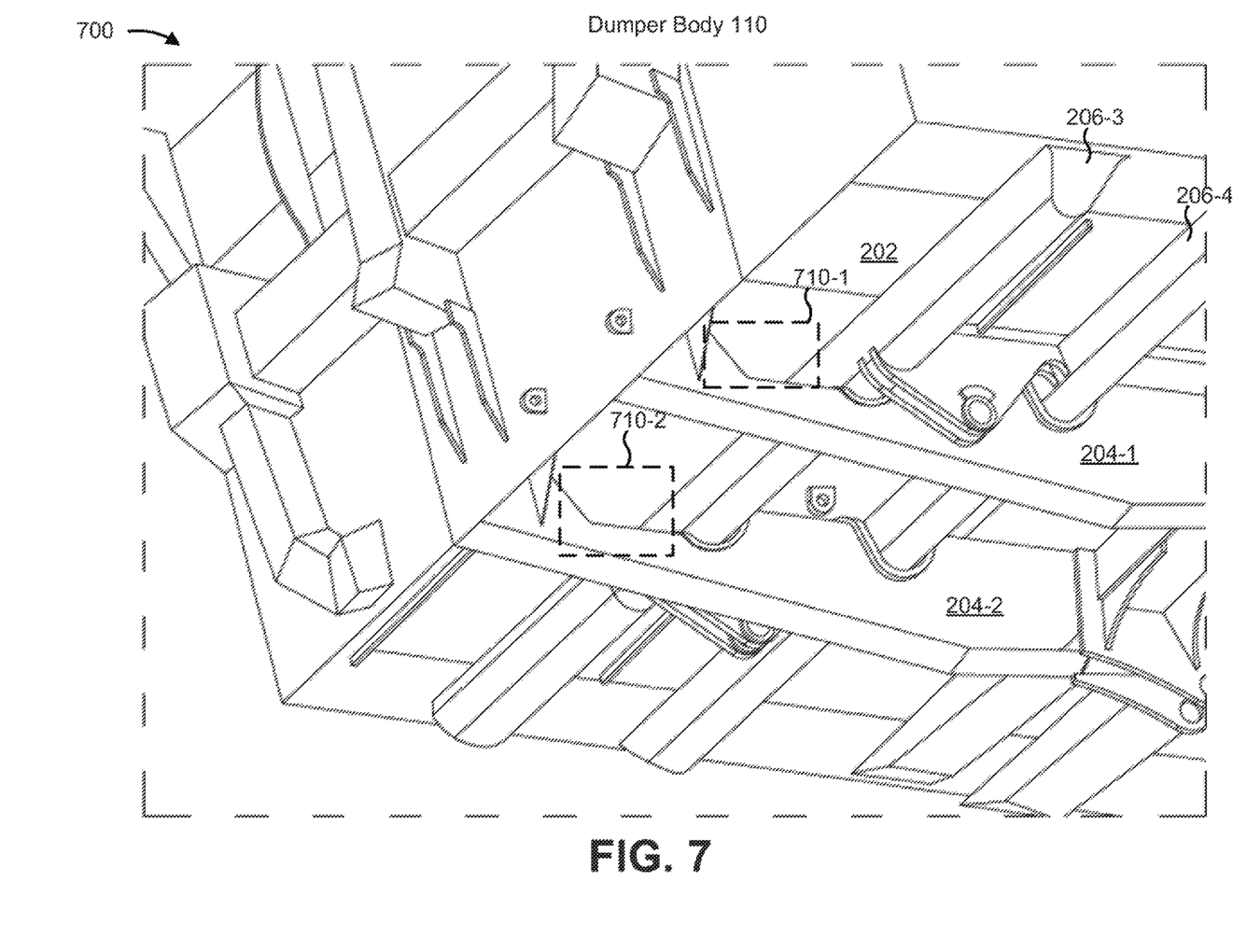
FIG. 7 is a diagram of a perspective view of multiple stringers installed on a dumper body of the example machine of FIG. 1.

FIG. 7 is a diagram 700 of a perspective view of multiple stringers installed on a dumper body of the example machine of FIG. 1. For example, FIG. 7 shows a front end of multiple stringers 204 installed on the dumper body 110 (e.g., shows an end of the dumper body 110 that includes a front wall, as described elsewhere herein, and an end of the multiple stringers 204 connected to the end of the dumper body 110).

As shown in FIG. 7, the set of stringers 204 may include a respective stringer cut-out 710 (e.g., the stringer cut-outs 710-1 and 710-2). For example, the stringer 204-1 may include the stringer cut-out 710-1 and the stringer 204-2 may include the stringer cut-out 710-2. In some implementations, a stringer cut-out 710 may be formed such that a portion of a stringer 204 that includes the stringer cut-out 710 is not connected to the bed plate 202 of the dumper body 110 when the stringer 204 is connected to the bed plate 202. In some implementations, the stringer cut-outs 710 may be formed by removing material from the stringers 204 during fabrication of the stringers 204. Additionally, or alternatively, the stringer cut-outs 710 may be formed by shaping the stringers 204 during fabrication of the stringers 204. Additionally, or alternatively, the stringer cut-outs 710 may be formed by as a result of a shape of separate portions of the stringers 204 that are connected together to form the stringers 204.

As indicated above, FIG. 7 is provided as an example. Other examples are possible and may differ from what was described with regard to FIG. 7. In some implementations, the dumper body 110 may include additional components, fewer components, different components, or differently arranged components than those shown in FIG. 7.

Figure 8:
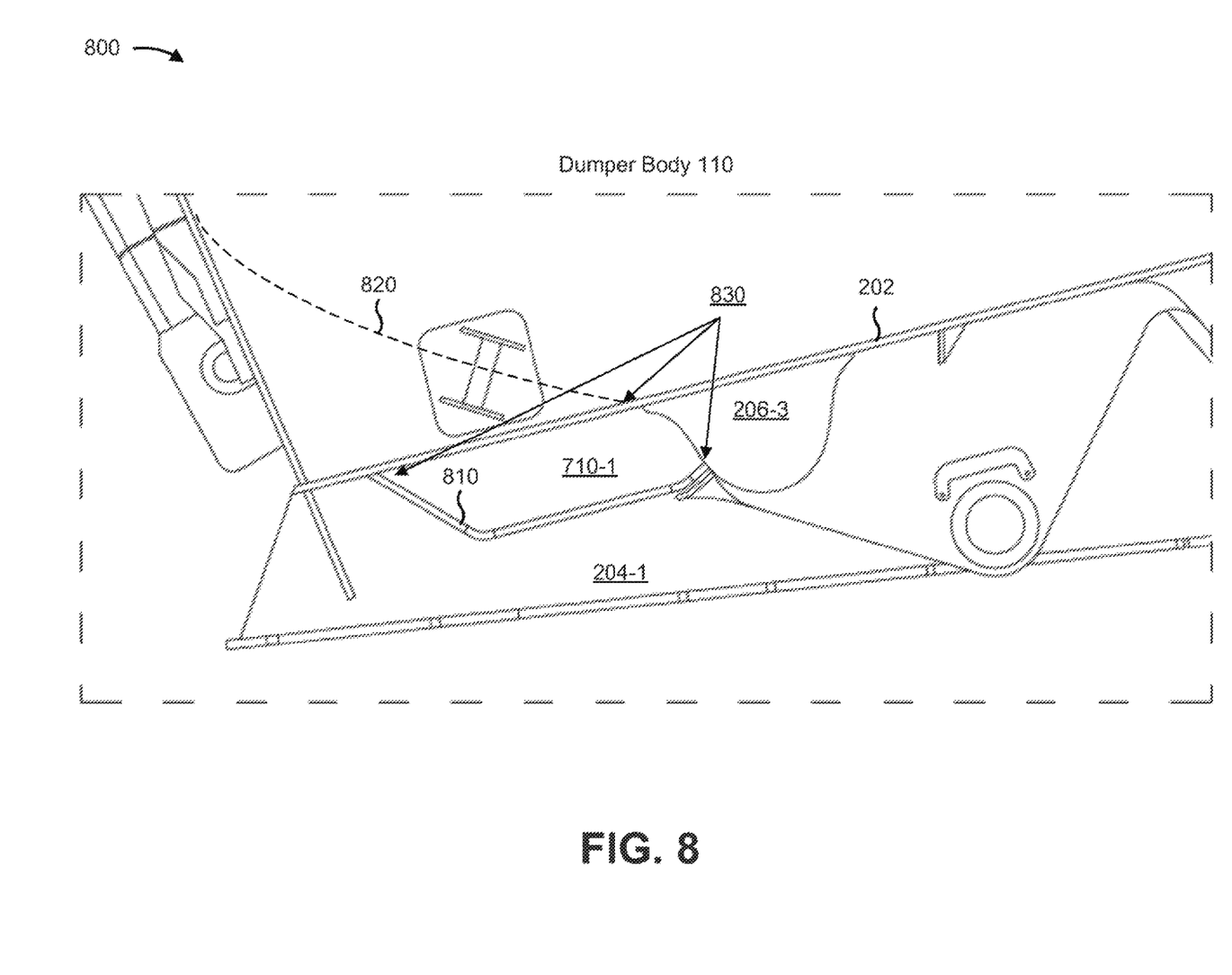
FIG. 8 is a diagram of a side view of a stringer installed on a dumper body of the example machine of FIG. 1.

FIG. 8 is a diagram 800 of a side view of a stringer installed on a dumper body of the example machine of FIG. 1. For example, FIG. 8 shows a side view of the end of the dumper body 110 shown in FIG. 7.

As shown in FIG. 8, the stringer 204-1 may include a cover plate 810 (e.g., a set of stringers 204 associated with the dumper body 110 may include a respective cover plate 810). For example, the cover plate 810 may be associated with the stringer cut-out 710-1 (e.g., may partially define the stringer cut-out 710-1). In some implementations, the cover plate 810 may be formed from metal. In some implementations, the cover plate 810 may enclose an interior of the stringer 204-1, such as when the stringer 204-1 is formed in a generally "U" shape, in a generally "V" shape, and/or the like. In this way, the cover plate 810 may protect the interior of the stringer 204-1 from debris and/or other material. In some implementations, the cover plate 810 may provide mechanical support to the stringer 204-1, such as to reduce or eliminate deformation of the stringer 204-1.

As further shown in FIG. 8, the dumper body 110 may include a top plate 820. For example, the top plate 820 may be included in a box portion of the dumper body 110 and may be connected to an inside surface of a front plate of the dumper body 110 and an inside surface of the bed plate 202. In some implementations, the top plate 820 may be curved in shape and may mechanically support a payload when loaded in the box portion of the dumper body 110.

As shown by reference number 830, the stringer 204-1 may be connected to the dumper body 110 at an end of an outside surface of the bed plate 202 and on a first side of a point where the top plate 820 connects to an inside surface of the bed plate 202, and to rib 206-3 (e.g., different than ribs 206-1 and 206-2) connected to the outside surface of the bed plate 202 on a second side of the point where the top plate 820 connects to the inside surface of the bed plate 202. For example, the left arrow associated with reference number 830 shows the stringer 204-1 connected to the dumper body 110 at an end of an outside surface of the bed plate 202 and on a first side of a point (shown by the middle arrow) where the top plate 820 connects to an inside surface of the bed plate 202. Continuing with the previous example, the right arrow associated with reference number 830 shows the stringer 204-1 connected to the rib 206-3 (e.g., different than the ribs 206-1 and 206-2) connected to the outside surface of the bed plate 202 on a second side of the point (shown by the middle arrow) where the top plate 820 connects to the inside surface of the bed plate 202.

As further shown by reference number 830, the top plate 820 may generally not intersect the rib 206-3 and/or may not be connected to the stringer 204-1 via the bed plate 202 (e.g., as shown by the middle arrow associated with reference number 830). Due to this, the cut-out 710-1 may provide flexibility to the dumper body 110, thereby reducing or eliminating localized stiffness which was previously occurring between the top plate 820 and the stringer 204-1 via the bed plate 202, when both were connected to each other, without the cut-out 710-1, via the bed plate 202.

In some implementations, other stringers 204 connected to the bed plate 202 may be configured in the same or a similar manner. For example, the stringer 204-2 (not shown in FIG. 8) may include a cover plate 810 and may be connected to the dumper body 110 in a manner that is the same as or similar to that described with regard to the stringer 204-1.

As indicated above, FIG. 8 is provided as an example. Other examples are possible and may differ from what was described with regard to FIG. 8. In some implementations, the dumper body 110 may include additional components, fewer components, different components, or differently arranged components than those shown in FIG. 8.

INDUSTRIAL APPLICABILITY

The disclosed dumper body 110 may be used with any machine that includes a dumper body, such as an off-highway truck 105. By including portions of a set of ribs 206 connected to a set of pivot assemblies 208 (e.g., the portions 402-1a through 402-1c for the rib 206-1 and the portions 402-2a through 402-2c for the rib 206-2), an unloaded weight of the dumper body 110 may be reduced. For example, the set of ribs 206 may not include material that would otherwise be included in the set of ribs 206 when the set of ribs 206 is formed as a respective continuous structure. This reduces an unloaded weight of the dumper body 110 and increases a weight of a payload that the off-highway truck 105 can receive. In addition, by including a set of gussets 340 that is connected to the rib 206 and to the pivot assembly 208, a structural integrity of the dumper body 110 may be substantially maintained despite the lack of material that would otherwise be associated with the set of ribs 206.

Additionally, or alternatively, by including a set of ribs 206 that is formed in portions, a manufacturing time for the dumper body 110 may be reduced. For example, utilizing a set of ribs 206 in various portions may facilitate pre-fabrication and/or installation of the pivot assembly 208. This may reduce or eliminate a need for complicated and/or difficult welding to form a pivot assembly 208 around a rib 206 when the rib 206 is not formed from multiple portions.

By including a set of stringers 204 configured with a respective stringer cut-out 710, an unloaded weight of the dumper body 110 may be reduced, thereby increasing a weight of a payload that the off-highway truck 105 can receive. In addition, by being connected around a point where the top plate 820 connects to an inside surface of the bed plate 202 (e.g., to a front end of the bed plate 202 of the dumper body 110 and to a rib 206), a structural integrity of the dumper body 110 may be substantially maintained despite the lack of material that would otherwise be present in place of the stringer cut-out 710.

What is claimed is:

1. A dumper body, comprising:
   a pivot assembly; and
   at least one of:
      a set of ribs,
         wherein the set of ribs is connected to the pivot assembly such that the set of ribs is comprised of multiple respective discontinuous structures, and
         wherein the multiple respective discontinuous structures comprise:
            a first structure connected to a first plate of the pivot assembly, and
            a second structure connected to a second plate of the pivot assembly; and
      a set of stringers.

2. The dumper body of claim 1, wherein the dumper body further comprises:
   a respective set of gussets for the set of ribs,
      wherein the respective set of gussets is connected to the set of ribs and the pivot assembly; and
   a set of internal gussets within a body of the pivot assembly.

3. The dumper body of claim 1, wherein the set of ribs comprises multiple ribs that are connected to the dumper body and the pivot assembly such that a pivot bore of the pivot assembly is positioned between the multiple ribs.

4. The dumper body of claim 1, wherein at least one of the multiple respective discontinuous structures is connected to the dumper body between the pivot assembly and another pivot assembly of the dumper body.

5. The dumper body of claim 1, wherein the pivot assembly comprises a respective cut-out associated with the set of ribs.

6. The dumper body of claim 1,
   wherein the set of stringers connects to the dumper body at an end of an outside surface of a bed plate and on a first side of a point where a top plate of the dumper body connects to an inside surface of the bed plate and to a rib connected to the outside surface of the bed plate on a second side of the point where the top plate connects to the inside surface of the bed plate, and
   wherein the rib is not included in the set of ribs.

7. The dumper body of claim 1, wherein the set of stringers comprises:
   a respective stringer cut-out around an outside surface of a bed plate of the dumper body at a point where a top plate of the dumper body connects to an inside surface of the bed plate, and
   a cover plate associated with the respective stringer cut-out.

8. A machine, comprising:
a dumper body, wherein the dumper body comprises:
multiple pivot assemblies;
multiple ribs,
wherein the multiple ribs are connected to the multiple pivot assemblies such that the multiple ribs are comprised of multiple respective discontinuous structures, and
wherein the multiple respective discontinuous structures comprise:
a first structure connected to a first plate of a pivot assembly of the multiple pivot assemblies, and
a second structure connected to a second plate of the pivot assembly; and
multiple stringers.

9. The machine of claim 8, wherein the dumper body further comprises:
a respective set of gussets associated with the multiple ribs,
wherein the respective set of gussets is connected to the multiple ribs and to a respective plate of the multiple pivot assemblies.

10. The machine of claim 8,
wherein the first plate of the pivot assembly is an exterior plate of the pivot assembly,
wherein the second plate of the pivot assembly is an interior plate of the pivot assembly,
wherein the second structure is further connected to an interior plate of a different pivot assembly of the multiple pivot assemblies, and
wherein the multiple respective discontinuous structures further comprise:
a third structure connected to an exterior plate of the different pivot assembly.

11. The machine of claim 8, wherein each of the multiple stringers includes a respective pivot assembly of the multiple pivot assemblies.

12. The machine of claim 8, wherein the multiple pivot assemblies comprise multiple respective cut-outs associated with the multiple ribs.

13. The machine of claim 8, wherein the multiple stringers are connected to a bed plate at a first end of a respective stringer cut-out and to a rib, not included in the multiple ribs, at a second end of the respective stringer cut-out.

14. The machine of claim 13, wherein the multiple stringers comprise a respective cover plate associated with the respective stringer cut-out.

15. A pivot assembly, comprising:
multiple plates, wherein the multiple plates comprise:
a respective pivot bore and a respective doubler,
wherein a first respective portion of a set of ribs of a dumper body is connected to a first plate, of the multiple plates, and a second respective portion of the set of ribs is connected to a second plate of the multiple plates,
wherein the first respective portion and the second respective portion are discontinuous from each other; and
multiple sets of gussets,
wherein a first set of gussets, of the multiple sets of gussets, is connected to the first plate and the first respective portion, and a second set of gussets, of the multiple sets of gussets, is connected to the second plate and the second respective portion.

16. The pivot assembly of claim 15, wherein the pivot assembly is included in a stringer of the dumper body,
wherein the stringer includes a stringer cut-out around an outside surface of a bed plate of the dumper body at a point where a top plate of the dumper body connects to an inside surface of the bed plate.

17. The pivot assembly of claim 16, wherein the stringer is connected to the bed plate at a first end of the stringer cut-out and is connected to a rib, not included in the set of ribs, at a second end of the stringer cut-out,
wherein the first end and the second end are different from each other.

18. The pivot assembly of claim 16, wherein the stringer includes a cover plate associated with the stringer cut-out around the point where the top plate of the dumper body connects to the inside surface of the bed plate.

19. The pivot assembly of claim 15, wherein the second respective portion of the set of ribs is connected to another pivot assembly of the dumper body.

20. The pivot assembly of claim 15, wherein the first plate and the second plate comprise a respective cut-out for the set of ribs.

* * * * *